(12) United States Patent
Batten et al.

(10) Patent No.: US 6,878,270 B1
(45) Date of Patent: Apr. 12, 2005

(54) LOW COST GREASE REMOVAL SYSTEM

(75) Inventors: William C. Batten, Asheboro, NC (US); Bruce W. Kyles, Asheboro, NC (US)

(73) Assignee: Thermaco, Inc., Asheboro, NC (US)

( * ) Notice: Subject to any disclaimer, the term of this patent is extended or adjusted under 35 U.S.C. 154(b) by 0 days.

(21) Appl. No.: 10/767,145

(22) Filed: Jan. 29, 2004

Related U.S. Application Data

(62) Division of application No. 10/161,814, filed on Jun. 4, 2002, now Pat. No. 6,800,195.

(51) Int. Cl.[7] .................................................. C02F 1/40
(52) U.S. Cl. ....................... 210/305; 210/307; 210/521; 210/540; 210/523
(58) Field of Search .............................. 210/242.3, 299, 210/305, 307, 523, 532.1, 538, 540

(56) References Cited

U.S. PATENT DOCUMENTS

| | | | |
|---|---|---|---|
| 530,684 A | 12/1894 | Gibbons | |
| 773,362 A | 10/1904 | Anderson | |
| 3,365,060 A | 1/1968 | Hsu | 210/84 |
| 3,426,902 A | 2/1969 | Kilpert et al. | 210/179 |
| 4,208,291 A | 6/1980 | Ochoa | 210/523 |
| 4,235,726 A | 11/1980 | Shimko | 210/523 |
| 4,268,396 A | 5/1981 | Lowe | 210/670 |
| 4,651,762 A | 3/1987 | Bowden | 134/111 |
| 4,681,680 A | * 7/1987 | Delons et al. | 210/242.3 |
| 5,133,881 A | 7/1992 | Miller et al. | 210/776 |
| 5,167,815 A | 12/1992 | Bachmann et al. | 210/242.3 |
| 5,344,566 A | 9/1994 | Clancey | 210/638 |
| 5,360,555 A | 11/1994 | Batten | 210/803 |
| 5,522,990 A | 6/1996 | Davidian | 210/242.3 |
| 5,714,069 A | * 2/1998 | Sager | 210/540 |
| 5,827,425 A | * 10/1998 | McKinnon | 210/307 |
| 5,993,646 A | * 11/1999 | Powers | 210/540 |
| 6,491,830 B1 | * 12/2002 | Batten et al. | 210/521 |
| 6,619,310 B1 | * 9/2003 | Evanovich et al. | 220/4.14 |
| 2002/0003104 A1 | 1/2002 | Evanovich et al. | 210/153 |

FOREIGN PATENT DOCUMENTS

| | | |
|---|---|---|
| DE | 32 15896 | 11/1983 |
| GB | 10958 | 11/1914 |
| JP | 48 30826 | 9/1973 |
| JP | 60 120022 | 6/1985 |
| NL | 8502049 | 7/1985 |
| RU | 1269809 | 10/1983 |

* cited by examiner

*Primary Examiner*—Christopher Upton
(74) *Attorney, Agent, or Firm*—MacCord Mason PLLC

(57) ABSTRACT

A low cost oil, grease removal assembly includes a rotomolded plastic container having an inlet and an outlet; a rotomolded plastic basket support located at the inlet inside the container; a rotomolded plastic outlet baffle located in the container at the outlet; a plurality of container cover sections including a first section to cover the basket support, a second container cover section having an oil, grease removal mechanism downstream of the basket support and upstream of the outlet baffle, and a third container cover section to cover the outlet baffle.

1 Claim, 8 Drawing Sheets

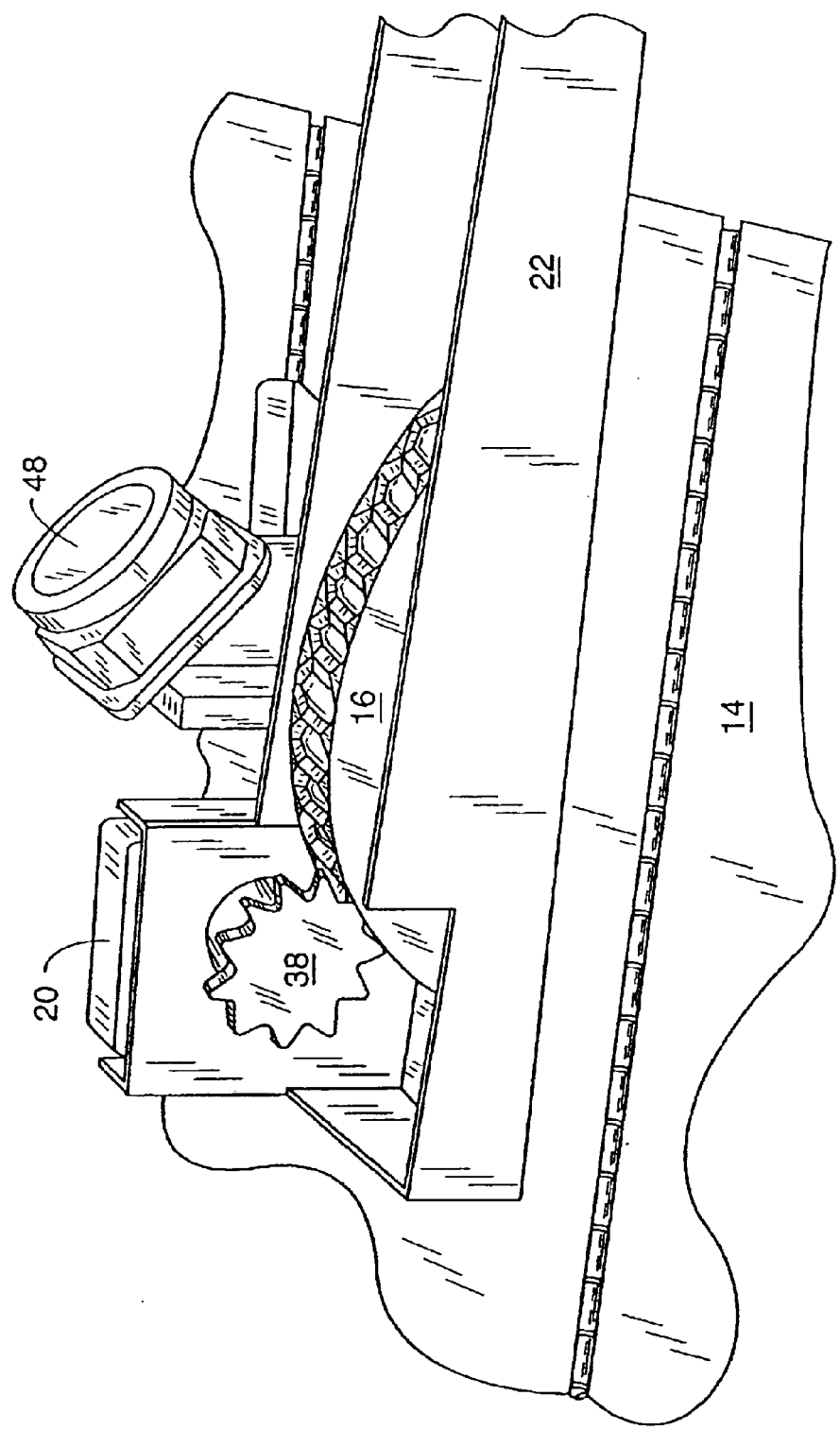

LOW COST GREASE REMOVAL SYSTEM

This application is a division of utility application Ser. No. 10/161,814 filed Jun. 4, 2002, and now U.S. Pat. No. 6,800,195.

BACKGROUND OF THE INVENTION

This invention relates to a low cost assembly for the removal and recovery of oil, grease and solid wastes found in drains or effluent discharge of restaurants, food processing, or like facilities, industrial plants, maintenance facilities, or other circumstances involving mixtures of oil, grease and solid waste material to be recovered or removed.

DESCRIPTION OF PRIOR ART

Oil, grease and solid waste contaminant removal or recovery systems are well known in the prior art. Over the past thirty years there has been a steady move towards requiring food handling facilities to have systems for servicing kitchen grease and solid waste bearing water flows. Sewer system lines can become clogged from the oil-and grease waste materials put into the sewer system from food handling facilities. This has led more and more sewer authorities to implement fats, oils and grease control programs. These programs regulate food handling facilities and the manner in which they process oil, grease and solid waste material. The object of many of these programs is to ensure that food handling facilities remove as much of the oil and grease as possible from the effluent flow, thereby releasing only grey water to the sewer system.

One method recognized in the prior art of accomplishing such removal is the use of a container including one or more rotating disks formed of a plastic or like applicable material to which oil and grease contaminants are attracted. Typically, the rotation of the disk is in an at least partially immersed condition, which allows the oil to cling to one or both sides of the disk so that contaminants are removed from the body of water upon rotation of the disk. Scrapers are typically used to force the oil contaminants from the opposite sides of the disk and channel such contaminants to a collection or disposal storage unit.

U.S. Pat. No. 5,133,881 to Miller et al. is representative of such oil and grease removal systems containing one or more rotating disks. The Miller et al. patent discloses an oil or grease removal assembly which removes such contaminants from the surface of the body of water and includes a rotatable disk made of plastic or other material to which such oil contaminants have an affinity so they adhere to the disk. The disk is disposed in cooperative relation to an elongated trough having scraper blades for engaging the opposite sides of the disk for the removal of the oil contaminants therefrom with the trough disposed and structured to direct such oil contaminants away from the disk and the body of water via the trough to a storage container. This patent, issued to B. Glenn Miller and William C. Batten and assigned to Thermaco, Inc. in Asheboro, N.C., is hereby incorporated herein by reference.

The existing devices may be difficult to service and are very often permanently installed at facility sites. Because many of the parts are coated with oil and grease, servicing can be messy and time consuming. In addition, these systems tend to be expensive and represent a significant capital investment. Accordingly, there is a need in the art for an apparatus for separation of oil, grease and solid waste from wastewater which is simple in design, low in cost and capable of being serviced easily in the field because of the availability of low cost replaceable parts which are easily installed and do not require extensive and costly repair.

SUMMARY OF THE INVENTION

The present invention fulfills one or more of these needs by providing an oil, grease and solid waste removal assembly which does not require significant capital outlay and is easy to service in the field.

The low cost oil, grease and solid removal assembly includes a container with stainless steel sectional covers for holding effluent water containing oil, grease and solid waste to be removed from said effluent water. The assembly further includes at least one rotatable disk which is supported by one of the sectional container covers and which is partially immersed within the body of effluent water, a drive means mounted on one of the sectional covers in driving engagement to provide rotation of the disk when the drive means is engaged, and an elongated trough mounted on the sectional cover in engaging relation to the opposite sides of the rotatable disk. Two elongated scraper blades mounted on the trough extend inward of the trough into sliding engagement with opposite sides of the disk, having the trough cooperatively disposed and structured to direct oil and grease from opposite sides of the disk along the scraper blades and flowing into the trough and into a storage container. The assembly has a basket support for holding a means to trap solid waste material. The container is constructed of rotomolded plastic and includes a thin stainless steel wrap to provide strength to the container assembly. The stainless steel wrap is constructed by two identical stainless steel pieces fastened at opposing corners by welding, attaching screws, rivets or some other mechanical means. The container may also be constructed of welded stainless steel The container further includes inlet and outlet pipes with the basket support immediately downstream from the inlet pipe. The basket support is designed to hold a strainer which traps solid waste material from the effluent water flow. The basket support further contains cutouts to permit the effluent water with oil and grease to flow downstream of the basket support once the solid waste material has been contained. The basket support section has a sectional cover which is also made of stainless steel, and provides easy access for removal and emptying of the strainer basket when the strainer basket is full of solid waste material.

The low cost oil, grease and solid waste assembly further includes a center sectional cover. This center sectional cover is constructed of stainless steel and has at least one rotatable disk constructed of molded plastic, a gear drive motor, a drive sprocket and a trough constructed of rotomolded plastic. The trough has the elongated wiper blades, which are constructed of a soft plastic or rubber material. When the gear motor drive is engaged, it rotates the drive sprocket in rotation. The disk, which is cooperatively attached to the drive sprocket, rotates in an opposite direction. The wiper blades come into contact with the disk, forcing the oil and grease from the rotating disk into the trough and into the storage container.

Downstream of the center sectional cover the container further includes an outlet baffle constructed of rotomolded plastic. The outlet baffle permits the grey water to flow from the bottom of the container through the outlet pipe into the sewage system after the oil, grease and solid waste materials have been removed. The outlet baffle has a cover, as well, and constructed of stainless steel. These three covers are hinged together.

The center sectional cover in a completed assembly has a cover for the gear drive motor, the disk and trough. These covers are constructed of plastic.

BRIEF DESCRIPTION OF THE DRAWINGS

The invention will be better understood by a reading of the Detailed Description of the Preferred Embodiments along with a review of the drawings, in which:

FIG. 6A is a perspective side view of the center sectional cover with the gear drive motor, the disk, the trough and the timer;

DESCRIPTION OF THE PREFERRED EMBODIMENTS

Figure 1:
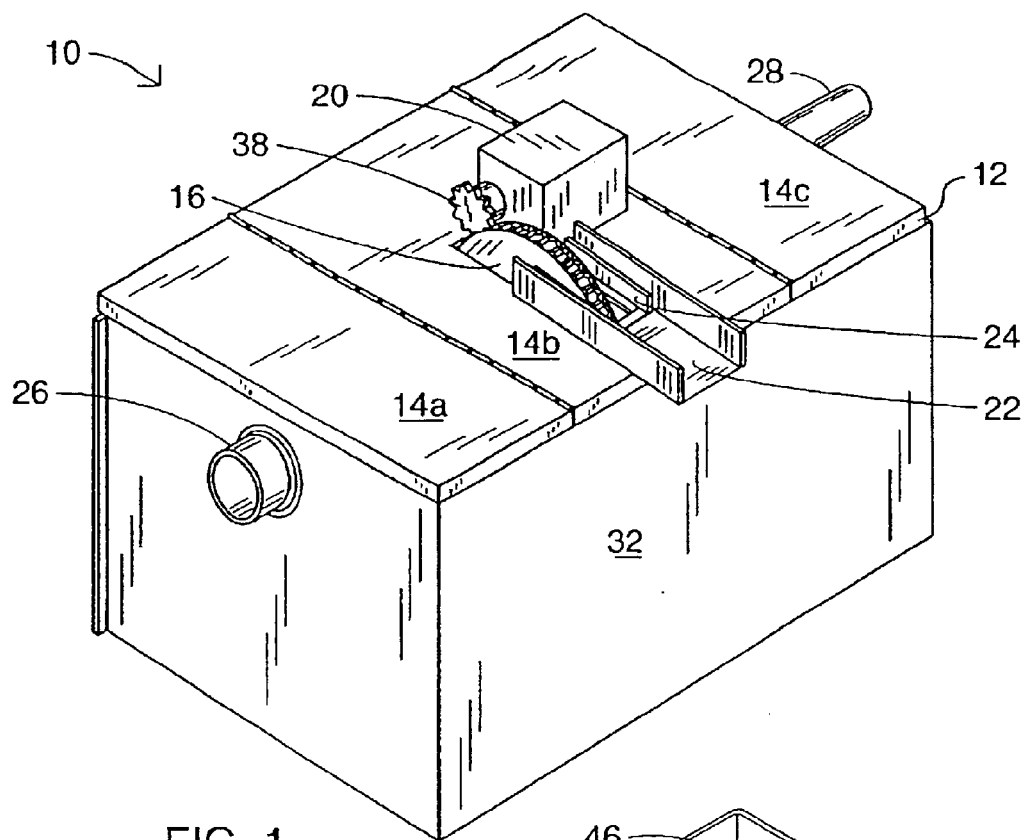
FIG. 1 is a perspective view of the preferred embodiment of the invention.

In the following description, like reference characters designate like or corresponding parts throughout the several figures. It should be understood that the illustrations are for the purpose of describing preferred embodiments of the invention and are not intended to limit the invention thereto.

Figure 6:
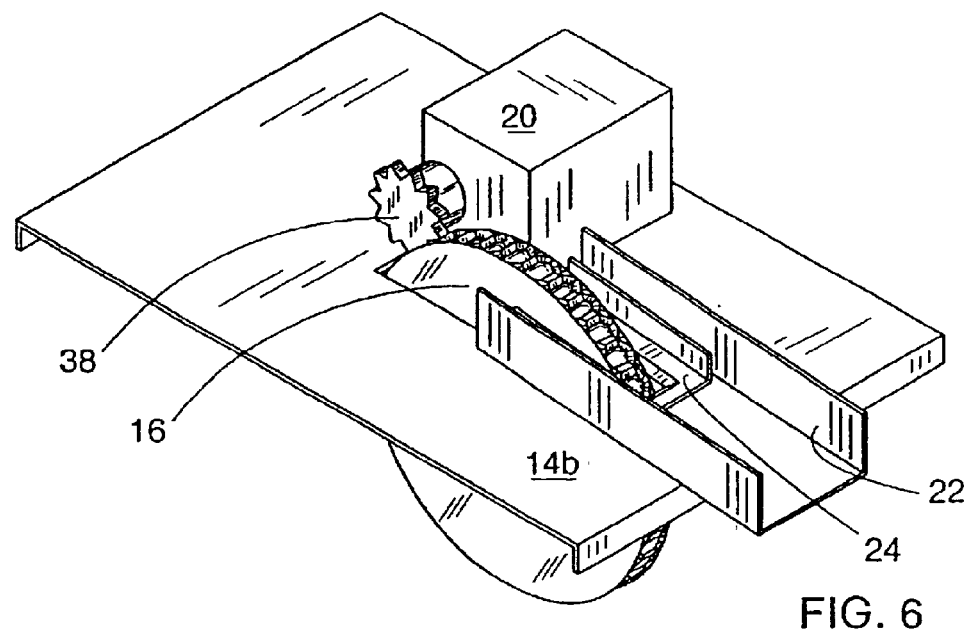
FIG. 6 is a perspective view of the center sectional cover with the gear drive motor, the disk, and the trough.
Figure 7:
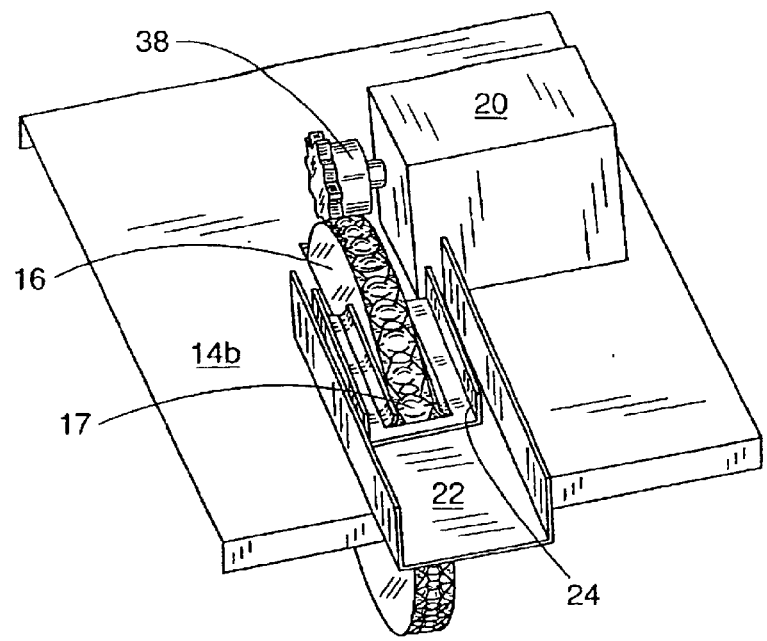
FIG. 7 is a top perspective view of the center sectional cover with the gear drive motor, disk, and trough.

As best seen in FIG. 1, the oil, grease and solid removal assembly 10 includes a container 12 with sectional covers 14a, 14b, and 14c. In a preferred embodiment as seen in FIG. 1, the sectional covers are joined by hinges. Alternatively, they can be separate units, the view of FIG. 6 being an example. The assembly 10 has at least one rotatable disk 16 supported by the center sectional cover 14b. FIG. 1 also depicts the gear drive motor 20 and the trough 22 which are attached to the center sectional cover 14b. The container 12 also includes an inlet pipe 26 and an outlet pipe 28. The effluent water with waste materials enters through the inlet pipe 26, and the grey water, after oil, grease and solid waste have been removed, exits out of the outlet pipe 28. As seen in FIG. 1, the trough 22 has scraper blades 24. The gear drive motor 20 supports and rotates the drive sprocket 38 which is cooperatively meshed with peripheral holes in the disk 16.

Figure 5:
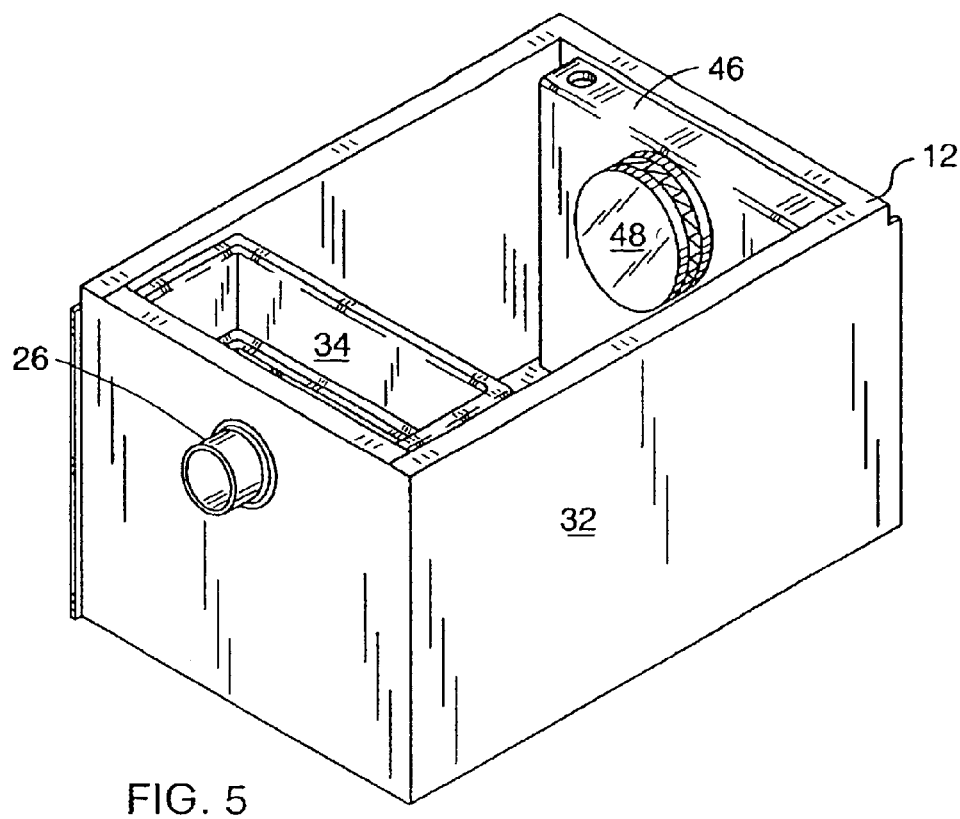
FIG. 5 is a perspective view of the container depicting the stainless steel wrap.

Referring to FIG. 5, the container 12 is constructed from rotomolded plastic and is covered by a thin stainless steel wrap 32 to provide strength and esthetics to the container 12. The stainless steel wrap 32 is applied in two sections fastened together at the right and left corners in the view of FIG. 5 by welding, screws, rivets, or any other desired mechanical means. In another embodiment, the container 14 may be constructed of stainless steel sections welded together.

The basket support 34 is depicted in FIGS. 2, 2A, 3 and 5. The basket support 34 is constructed of rotomolded plastic and is designed to hold a strainer basket 54. The basket support 34 is immediately downstream of the inlet pipe 26 and has a cutout 36 to align with the inlet pipe 26. Basket support openings 37 permits the effluent water with oil and grease to flow downstream of the basket support 34 after the solid waste material has been trapped in the strainer basket 54.

Figure 8:
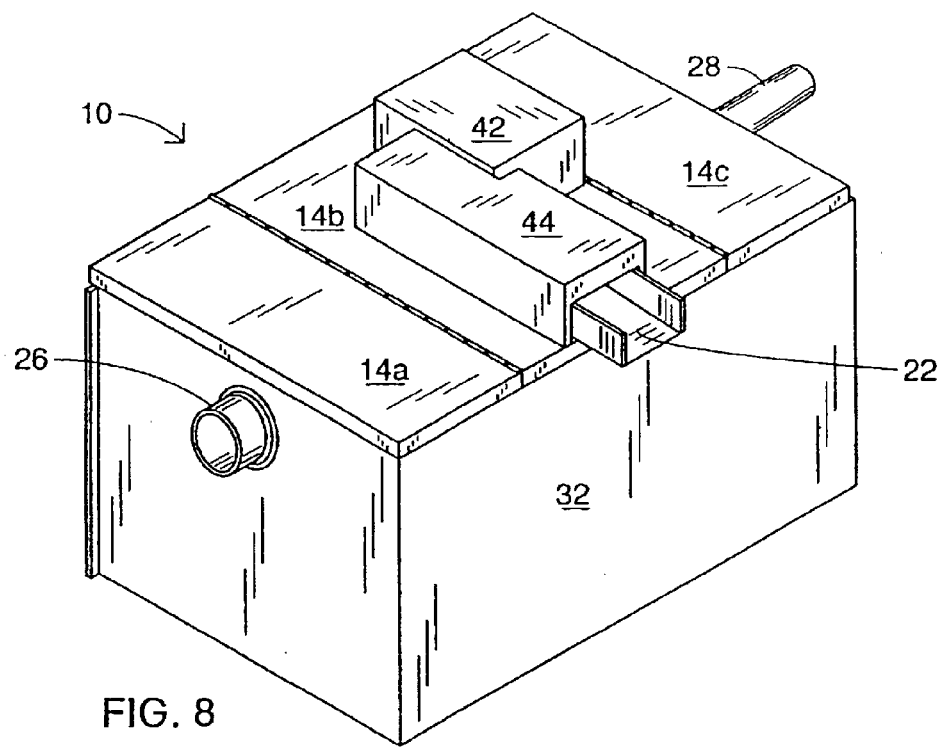
FIG. 8 is perspective view of the complete oil, grease and solid removal assembly with all the covers installed.

Referring to FIG. 8, the sectional covers 14a, 14b and 14c cover each of the sections of the oil, grease and solid waste removal assembly. In the preferred embodiment, the sectional covers are hinged, providing easy access to the strainer basket 54 within the basket support 34 and the outlet baffle 46.

The center sectional cover 14b is depicted in FIGS. 6, 6A, 7, and 7A. The center sectional cover 14b is constructed of stainless steel and includes a depending flange 15 seen in FIG. 7A that supports a rotatable disk 16. The rotatable disk 16 is constructed of oleophilic plastic or is at least covered with an oleophilic material. The disk 16 has equally spaced indentations 17 on its outer circumferential edge. The center sectional cover 14b further supports the gear drive motor 20. The gear drive motor 20 drives a sprocket 38. The sprocket 38 meshes with the holes 17 in the disk 16. The disk 16 is rotated clockwise in the view of FIG. 6A when the gear drive motor 20 rotates counter-clockwise.

Figure 7A:
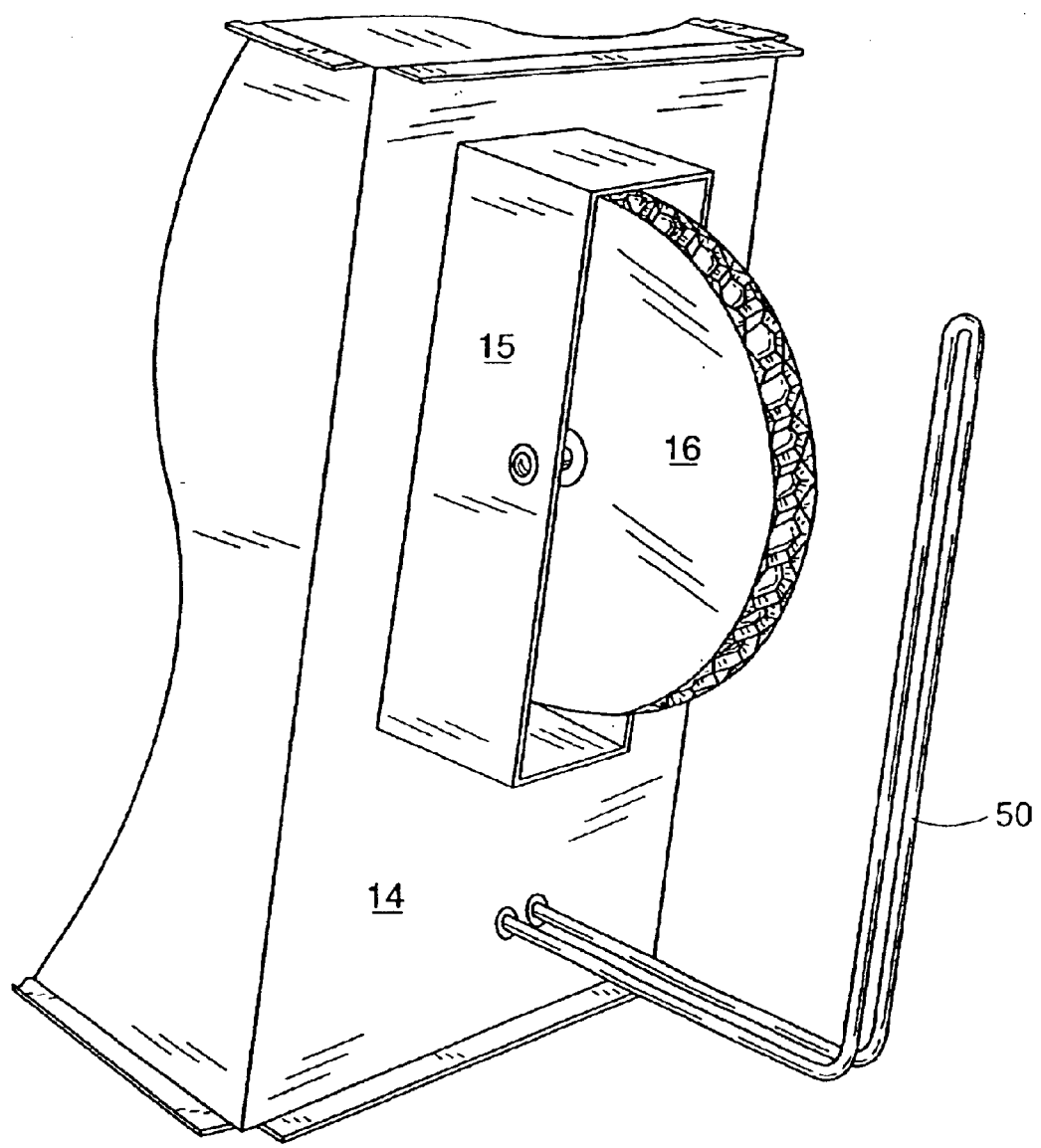
FIG. 7A is a bottom perspective view of the center sectional cover with the disk and heating element.

As best seen in FIGS. 6, 6A, 7 and 7A the center sectional cover 14b supports the trough 22, which is constructed of stainless steel. The trough 22 further includes elongated scraper blades 24 which are constructed of a flexible plastic or rubber material. As seen in FIG. 7A, the center sectional cover 14b also supports the heating element 50 which is utilized to maintain a sufficiently warm enough water temperature to melt any grease contained in the grey water, permitting it to flow to and be removed by the rotating disk 16. The heating element 50 is a 300 watt heater with a quick reaction thermostat and is designed to run continuously. The timer 50 is connected to the gear drive motor 20 and controls the start and stop operation of said gear drive motor 16 and ultimately the rotation of the disk 16. It permits a selected duty cycle to remove grease at times when grease is likely to be present.

Figure 2:
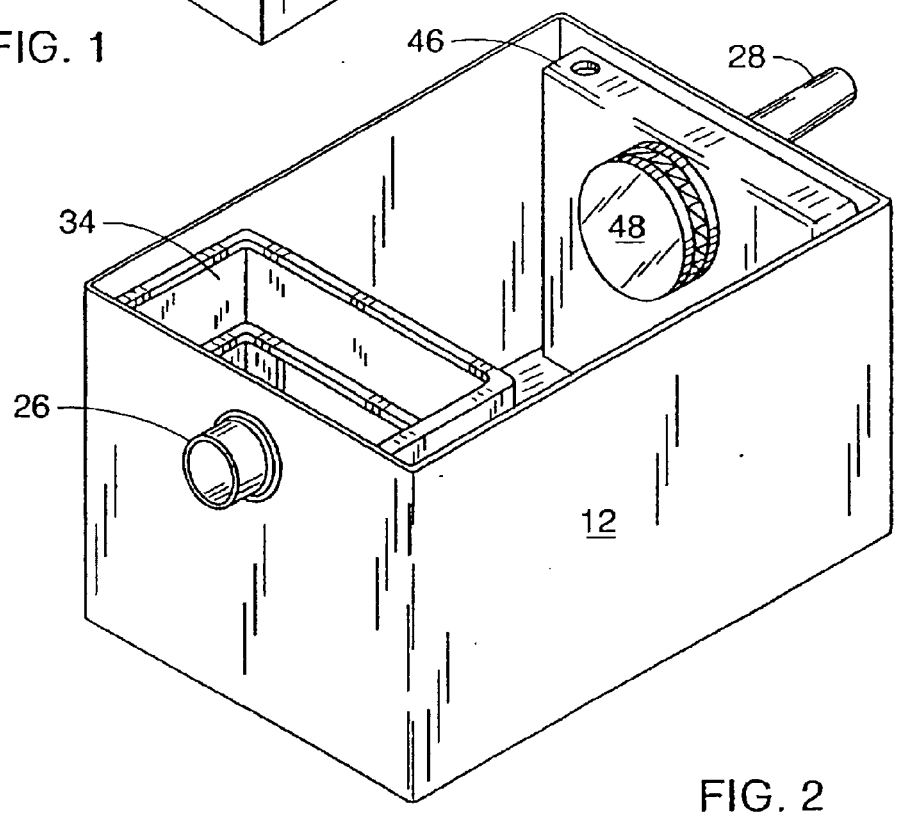
FIG. 2 is a perspective view of the container with the basket support and the outlet baffle installed.
Figure 2A:
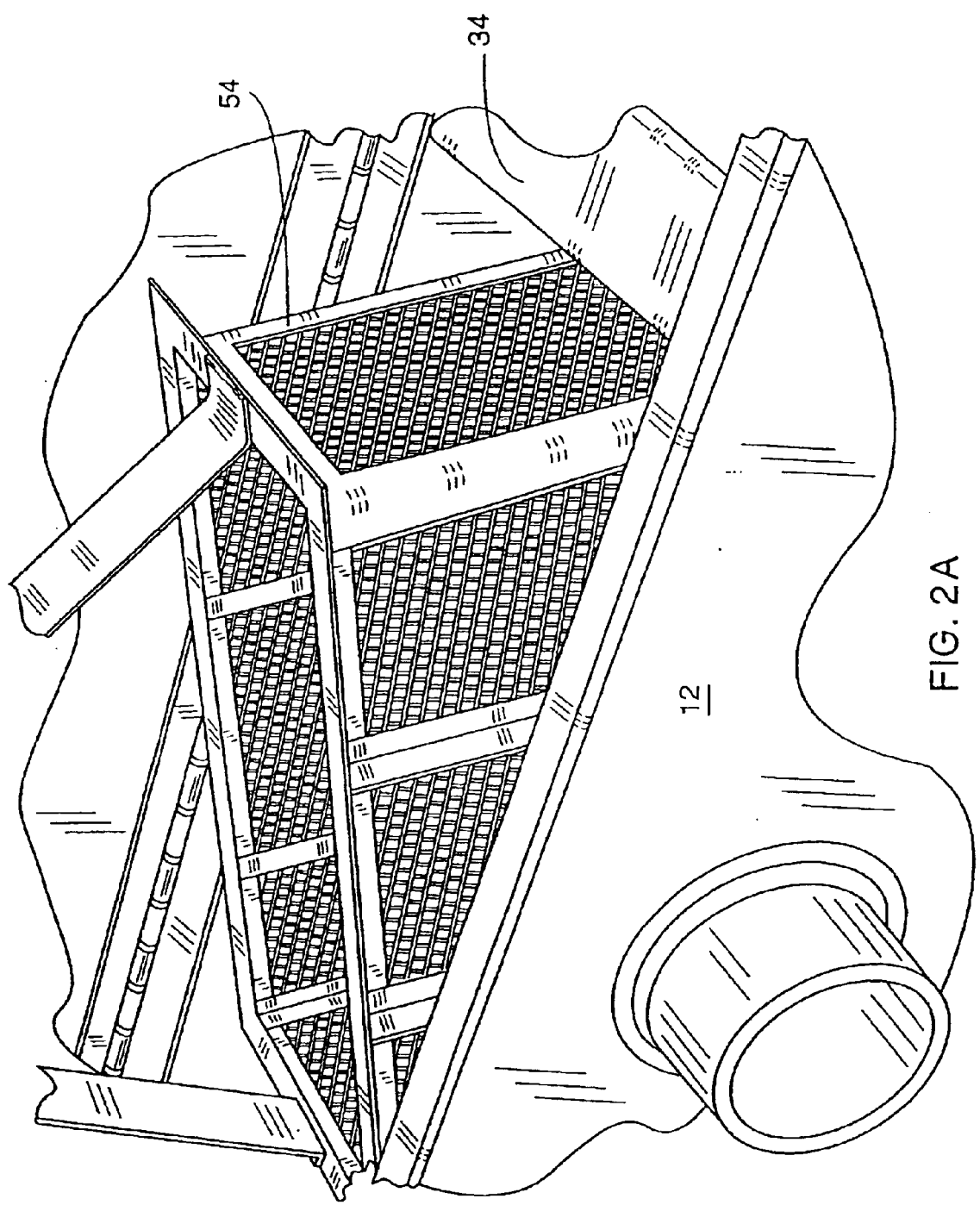
FIG. 2A is a perspective view of the container and basket support with the strainer basket being installed.
Figure 3:
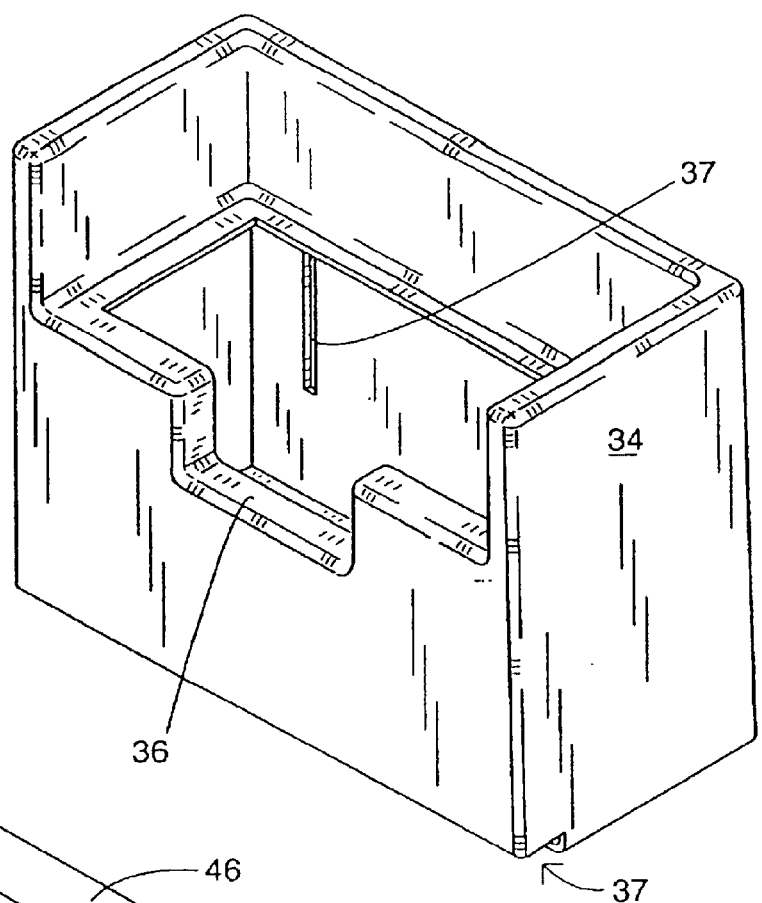
FIG. 3 is a perspective view of the basket support.
Figure 4:
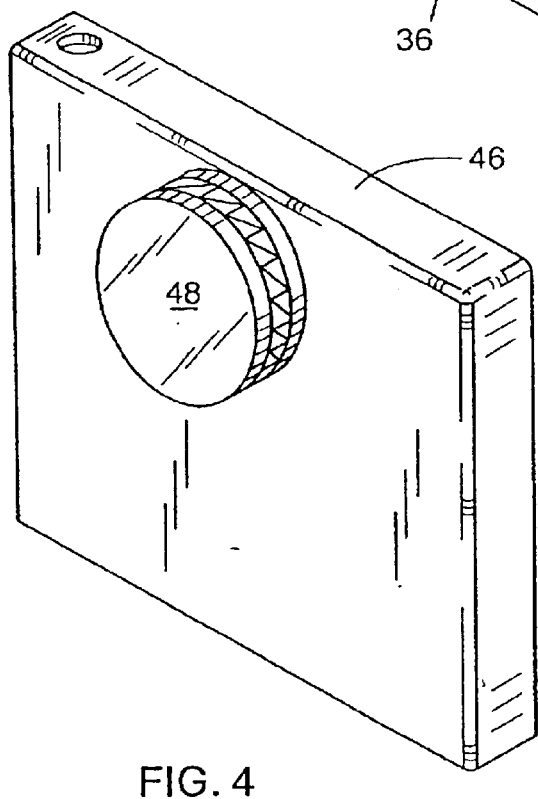
FIG. 4 is a perspective view of the outlet baffle.

Referring to FIGS. 2, 4 and 5, the outlet baffle 46 is downstream of the center sectional cover 14b. The outlet baffle 46 is also covered by a sectional cover 14c which is constructed of stainless steel and hinged to the center sectional cover 14b. The outlet baffle 46 is constructed of rotomolded plastic with an open bottom to permit water to flow from the bottom of the container to the outlet pipe 28. The outlet baffle 46 is mounted to the inside of container 12 with a clearance at the bottom of the container to let grey water into the volume of the outlet baffle 46. The outlet baffle 46 also has a baffle cap 48, which closes a temporary opening in the outlet baffle 46. The temporary opening permits access to the interior of the outlet baffle, so it can be welded to the plastic container 12.

The complete oil, grease and solid removal assembly 10 is depicted in FIG. 8. The gear drive motor cover 42 is shown, as well as the trough cover 44. These covers are constructed of stainless steel. When the trough cover 44 is removed, a safety switch (not shown) is activated which will not permit the assembly 10 to operate. When the trough cover 44 is in place, the assembly power can be engaged and the apparatus can be operated.

Figure 9:
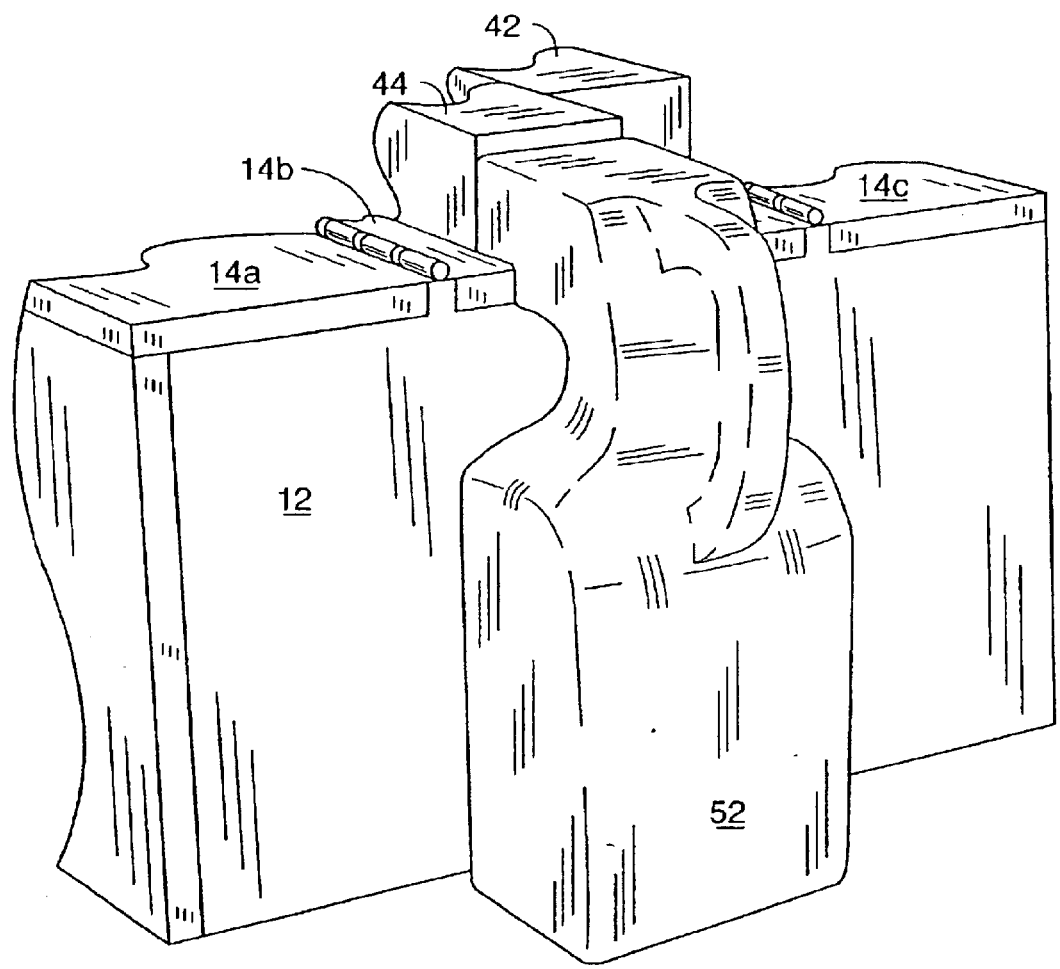
FIG. 9 is a front perspective view of the complete oil, grease and solid removal assembly with the oil/grease storage tank attached to the trough.

The oil/grease storage tank 52 is depicted in FIG. 9. The oil/grease storage tank 52 is attached to the trough 22 and receives the oil which has been scraped from the disk 16 by the scraper blades.

In the preferred embodiment, the oil, grease and solid removal assembly 10 is connected to drain from a sink or other device that discharges effluent water with waste materials to be separated. The water containing waste materials flows from the device's drain into the oil, grease and solid removal assembly 10 through the inlet pipe 26. The effluent water flows into the basket support 34 containing a strainer basket 54 and the solid waste materials are trapped and removed from the effluent water. The effluent water containing oil and grease flows downstream from the basket support 34 through openings 37 into the center section. The center section cover 14b supports the oil and grease removal assembly. In the volume of the container 12 between the basket support 34 and the outlet baffle 46, the effluent has time to reside, permitting oil and grease to rise to the top of the water. The grease is maintained in a liquid state by the heater 50. When the gear drive motor 20 turns the drive sprocket 38, the disk 16 is rotated in a clockwise direction by the counter clockwise rotation of the drive sprocket 38. The disk 16 is positioned in the center cover 14b, so that its lower portion is below the surface of the effluent water having the oil and grease which has floated to the surface. As the disk 16 rotates through the water, oil and grease are picked up on the sides of the disk 16. As the disk 16 rotates, the scraper blades 24 which are attached to the trough 22 remove the oil and grease from the sides of the disk 16. The oil and grease flows down the trough 22 to oil and grease storage container 52. Once the oil and grease have been removed from the effluent water, the grey water flows downstream under the baffle outlet 46 and exits the oil, grease and solid removal assembly 10 through the outlet pipe 28 into the sewage system.

The oil, grease and solid removal assembly 10 is easy to maintain. The center section cover 14b containing the gear drive motor 20, the drive sprocket 38, the disk 16, the trough 22 and the scraper blades 24 is a single, low cost unit. If there is a malfunction in any of the components of this unit, it is more cost effective to replace the entire unit than to repair the malfunctioning component. By stocking an extra unit at the facility site, virtually no down time in operation of the low cost oil, grease and solid removal assembly 10 would be experienced. In addition, because the center section cover 14 contains all of the oil and grease removal components, there is a greater flexibility in the installation process. The sectional cover 14b can be installed to have the trough 22 facing in opposite directions by placing the sectional cover one way or the opposite way, depending on the needs of the installation. The hinged sectional covers 14a and 14c are thus both possibly positioned over the strainer basket, depending on the selected orientation.

The container 12 of the low-cost oil, grease and solid removal assembly 10 is constructed of a rotomolded plastic or welded stainless sheets. The container 12 is constructed with an inlet pipe 26 and the outlet pipe 28 both made of plastic. The basket support 34 constructed of rotomolded plastic is then welded downstream of the inlet pipe 26 of the container 12 with the cut out 36 aligned with the inlet pipe 26. The outlet baffle 46 constructed of rotomolded plastic is welded in place immediately upstream of the outlet pipe 28 in the container 12. Access to the interior of the outlet baffle is provided by the opening in the outlet baffle. The baffle cap 48 is then installed so that the only water entering the outlet baffle is from below the baffle. The next step in the installation process, if the container 12 is rotomolded plastic, is to install the stainless steel wrap 32 around the body of the container 12. The stainless steel wrap 32 comes in two sections and each section covers one end and one side. The stainless steel wrap 32 has appropriate cutouts to accommodate the inlet pipe 26 and the outlet pipe 28. Once in place around the container 12, the stainless steel wrap 32 sections are fastened together. The sectional covers 14 can then be installed, although they may well be removed and reinstalled at the jobsite. The center sectional cover 14b has the gear drive motor 20, the drive sprocket 38, the rotating disk 13 and the trough 22 with scraper blades installed in the cover. Once the three sectional covers 14 are in place, the gear drive motor cover 42 and the trough cover 44 are then put in place, thus completing the assembly of the low-cost oil, grease and solid removal assembly 10.

Rotomolding is the preferred fabrication method for the several components because of its low cost.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A low cost oil, grease removal assembly comprising:

a rotomolded plastic container having an inlet and an outlet;

a rotomolded plastic basket support located at the inlet inside the container;

a rotomolded plastic outlet baffle located in the container at the outlet;

a plurality of container cover sections including a first section to cover the basket support;

a second container cover section having an oil, grease removal mechanism downstream of the basket support and upstream of the outlet baffle; and a third container cover section to cover the outlet baffle.

* * * * *